United States Patent
Wang

(10) Patent No.: US 11,496,841 B2
(45) Date of Patent: Nov. 8, 2022

(54) MICROPHONE, AND INTELLIGENT VOICE DEVICE

(71) Applicant: BAIDU ONLINE NETWORK TECHNOLOGY (BEIJING) CO., LTD., Beijing (CN)

(72) Inventor: Xin Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 359 days.

(21) Appl. No.: 16/805,427

(22) Filed: Feb. 28, 2020

(65) Prior Publication Data

US 2020/0314558 A1 Oct. 1, 2020

(30) Foreign Application Priority Data

Mar. 28, 2019 (CN) .......................... 201910244365.1

(51) Int. Cl.
*H04R 17/02* (2006.01)
*H04R 19/04* (2006.01)
*G10L 15/22* (2006.01)
*H04R 1/04* (2006.01)

(52) U.S. Cl.
CPC .............. *H04R 19/04* (2013.01); *G10L 15/22* (2013.01); *H04R 1/04* (2013.01)

(58) Field of Classification Search
CPC ........ H04R 3/00; H04R 3/002; H04R 19/016; H04R 17/02
USPC .................................................. 381/111–115
See application file for complete search history.

(56) References Cited

U.S. PATENT DOCUMENTS

2010/0142742 A1 6/2010 Tanaka et al.
2019/0202685 A1* 7/2019 Wang ...................... B81B 7/007

FOREIGN PATENT DOCUMENTS

| CN | 104507029 A | 4/2015 |
| CN | 204291393 U | 4/2015 |
| CN | 205378215 U | 7/2016 |
| CN | 106412783 A | 2/2017 |

(Continued)

OTHER PUBLICATIONS

Chinese Patent Application No. 201910244365.1 Second Office Action dated Jul. 1, 2020, 6 pages.

(Continued)

*Primary Examiner* — George C Monikang
(74) *Attorney, Agent, or Firm* — Lathrop GPM LLP

(57) ABSTRACT

Embodiments of the present disclosure provide a microphone and an intelligent voice device. The microphone includes a housing, a diaphragm, a primary sound pickup component, and a secondary sound pickup component. The diaphragm is configured to output an electric signal according to a sound pressure acting on the first sound pickup surface and the second sound pickup surface. The primary sound pickup component is formed on the housing, and configured to transmit a sound wave from outside of the housing to the first sound pickup surface through a primary sound pickup channel at a first sound pressure. The secondary sound pickup component is formed on the housing, and configured to transmit the sound wave to the second sound pickup surface through a secondary sound pickup channel at a second sound pressure, the secondary sound pickup channel being different from the first sound pressure.

14 Claims, 1 Drawing Sheet

(56) References Cited

FOREIGN PATENT DOCUMENTS

| | | | |
|---|---|---|---|
| CN | 207382508 | U | 5/2018 |
| CN | 208128522 | U | 11/2018 |
| JP | 2010136131 | A | 6/2010 |
| JP | 2010136132 | A | 6/2010 |
| JP | 2011114506 | A | 6/2011 |
| JP | 2013110581 | A | 6/2013 |

OTHER PUBLICATIONS

Chinese Patent Application No. 201910244365.1 English translation of Second Office Action dated Jul. 1, 2020, 6 pages.
Japanese Patent Application No. 2020-036743 Office Action dated Mar. 9, 2021, 5 pages.
Japanese Patent Application No. 2020-036743 English translation of Office Action dated Mar. 9, 2021, 6 pages.
Chinese Patent Application No. 201910244365.1 Office Action dated Apr. 28, 2020, 10 pages.
Chinese Patent Application No. 201910244365.1 English translation of Office Action dated Apr. 28, 2020, 11 pages.

* cited by examiner

MICROPHONE, AND INTELLIGENT VOICE DEVICE

CROSS-REFERENCE TO RELATED APPLICATIONS

This application is based on and claims priority to Chinese Patent Application No. 201910244365.1, filed with the State Intellectual Property Office of P. R. China on Mar. 28, 2019, the entire contents of which are incorporated herein by reference.

TECHNICAL FIELD

Embodiments of the present disclosure mainly relate to the field of the microphone, and more particularly, to a microphone and an intelligent voice device based on a micro electro mechanical system.

BACKGROUND

At present, with the popularization of intelligent voice devices such as intelligent sound boxes and the like, requirements for microphones are higher and higher.

SUMMARY

Embodiments of a first aspect of the present disclosure provide a microphone. The microphone includes a housing, a diaphragm, a primary sound pickup component, and a secondary sound pickup component. The diaphragm is fixed in the housing, includes a first sound pickup surface and a second sound pickup surface opposite to each other, and is configured to output an electric signal according to a sound pressure acting on the first sound pickup surface and the second sound pickup surface. The primary sound pickup component is formed on the housing, and configured to transmit a sound wave from outside of the housing to the first sound pickup surface through a primary sound pickup channel at a first sound pressure. The secondary sound pickup component is formed on the housing, and configured to transmit the sound wave to the second sound pickup surface through a secondary sound pickup channel at a second sound pressure, the secondary sound pickup channel being different from the first sound pressure.

Embodiments of a second aspect of the present disclosure provide an intelligent voice device. The intelligent voice device includes the microphone as described above.

It should be understood that the summary is not intended to limit key or critical features of the embodiments of the present disclosure, nor is it intended to limit the scope of the present disclosure. Other features of the present disclosure will become apparent from the following description.

BRIEF DESCRIPTION OF THE DRAWINGS

The above and other features, advantages and aspects of the embodiments of the present disclosure will become more apparent with reference to the following detailed description when taken in combination with the accompanying drawings. In the drawings, identical or similar reference numerals indicate identical or similar elements, in which.

DETAILED DESCRIPTION

Figure 1:
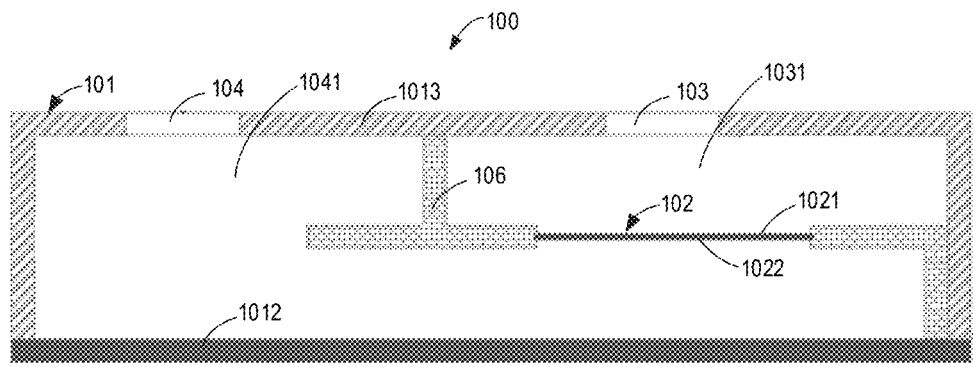
FIG. 1 is a schematic diagram of a microphone according to some embodiments of the present disclosure.

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only, and are not intended to limit the scope of the present disclosure.

In the description of the embodiments of the present disclosure, the term "include" and its equivalents should be construed as open inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

Specifically, most intelligent voice devices adopt omnidirectional sound collecting microphones based on micro electro mechanical system (MEMS). Restricted by the shape of the sound box, the microphone and speaker are close to each other, resulting in that the volume from the speaker to the microphone is large, sometimes much larger than that of from the user who controls the intelligent voice device to the microphone. On one hand, the recognition rate of the user's voice control instruction is reduced, and it is inconvenient for the user to control the intelligent voice device through voice. On the other hand, the playing effect of the speaker may be affected in some cases.

Although echo cancellation algorithms are currently configured to eliminate the adverse effect of the omnidirectional microphone as much as possible, the cancellation effect is limited, and it places significant algorithm pressure on the processor. At present, there are also electret-based directional microphones used in the intelligent voice device, due to their defects, the electret microphones also have problems such as large size, more limitations on product design, poor signal-to-noise ratio, poor consistency, and poor aging performance.

Currently, the omnidirectional microphone product based on MEMS adopted by the intelligent voice device such as the intelligent sound box cannot achieve speaker volume suppression, the voice recognition capability is poor, and the user experience is reduced. This is due to the limitation of the size of the sound box, the speaker and the microphone are close to each other, the volume from the microphone to the speaker (sometimes referred to as echo) may beyond that of the user's voice to the microphone, which makes the microphone cannot collect the voice control signal of the user well, and brings the problem of poor voice recognition capability of the intelligent sound box product using the microphone. Moreover, in some cases, the MEMS microphone may make the playing effect of the speaker worse, which affects the user experience.

Although there are solutions such as the echo cancellation algorithm for solving the above problem, the echo cancellation capability of the echo cancellation algorithm is limited, and only a part of the sound signals from the microphone can be eliminated, and sometimes there are problems such as false elimination. Furthermore, the echo cancellation algorithm may place significant algorithm pressure on the processor, and affect the efficiency of the processor when processing other tasks, the user experience is reduced in this respect.

There is also a solution to use the electret-based directional microphone to suppress sound coming from a particular direction (e.g. the speaker direction). However, the electret microphone has many defects and problems. For example, due to its principle, the diaphragm adopted by the electret microphone is relatively large (generally above 5 mm), which leads to a large size of the microphone. Moreover, the electret microphone cannot be soldered on the circuit board using the surface mount technology (SMT), resulting in a complicated structural design of the sound box product.

In addition, the electret-based directional microphone has many requirements for the mounting position, and it needs to have sufficient sound inlet area on the front and back of the microphone, which restricts the appearance of the product. In addition, the signal-to-noise ratio, the consistency, the aging performance and other indicators of the microphone are not as satisfying as those of the MEMS microphone.

In view of the above, embodiments of the present disclosure provide a directional microphone based on the MEMS, to address or at least partially address some of the problems or other potential problems of the microphone in the related art described above. Some exemplary embodiments will be described below with reference to FIG. 1 and FIG. 2.

Figure 2:
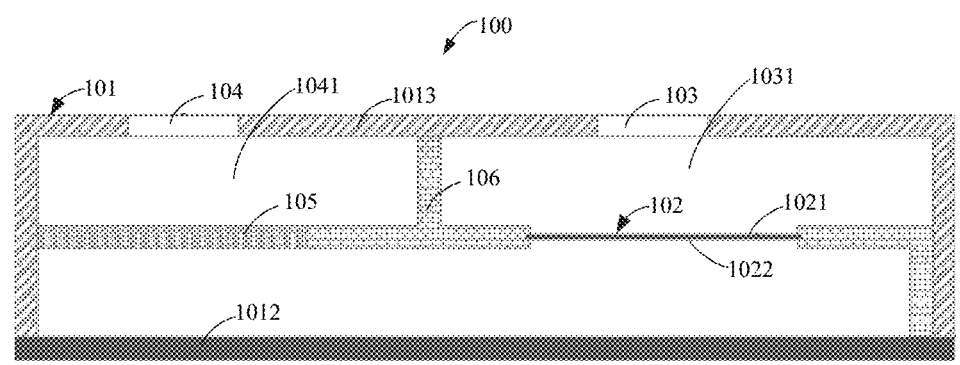
FIG. 2 is a schematic diagram of a microphone according to some other embodiments of the present disclosure.

FIG. 1 is a schematic diagram of a microphone 100 according to some embodiments of the present disclosure, and FIG. 2 is a schematic diagram of a microphone 100 according to some other embodiments of the present disclosure. In some embodiments, the microphone based on MEMS (the MEMS-based microphone) is made based on the MEMS technology. As shown in the figures, the MEMS-based microphone 100 generally includes a housing 101, a diaphragm 102, and two sound pickup components (such as sound pickup holes, hereinafter referred to as a primary sound pickup component and a secondary sound pickup component 104 for convenience of description). In some embodiments, each of the primary sound pickup component 103 and the secondary sound pickup component 104 may be a sound pickup hole, also referred to as the primary sound pickup hole 103 and the secondary sound pickup hole 104.

It should be noted that, although two sound pickup holes are illustrated in the figures, each of which has a single hole, the figures are illustrative only and are not intended to limit the scope of the present disclosure. The primary sound pickup hole 103 and the secondary sound pickup hole 104 may take any suitable form. For example, the primary sound pickup hole 103 and the secondary sound pickup hole 104 may be in the form of a single hole as shown in the figures. In some alternative embodiments, the primary sound pickup hole 103 and the secondary sound pickup hole 104 may also take the form of a group of holes, each of which includes a plurality of holes. All of the forms fall within the scope of the present disclosure.

The diaphragm 102 based on the MEMS is fixed in the housing 101, and a cavity structure is provided in the areas adjacent to two surfaces of the diaphragm 102. For convenience of description below, the two surfaces of the diaphragm 102 are referred to as a first sound pickup surface 1021 and a second sound pickup surface 1022, respectively. The diaphragm 102 may generate the electric signal according to sound pressure acting on the first sound pickup surface 1021 and the second sound pickup surface 1022. The electric signal here may be a capacitance signal generated according to the sound pressure. In some embodiments, the capacitance signal may be further processed to generate an audio electric signal representing the sound collected. For example, in some embodiments, the microphone 100 may further include an application specific integrated circuit (ASIC), the ASIC is coupled to the diaphragm by suitable means, so as to generate, according to the capacitance signal generated by the diaphragm 102, the audio electric signal for use by an external circuit, such as a processor.

Certainly, it should be understood that, the above-described embodiments of converting the capacitance signal generated by the diaphragm 102 into the audio electric signal by using the ASIC are merely exemplary, and are not intended to limit the scope of the present disclosure. Any other suitable manner or configuration is also possible. For example, in some alternative embodiments, the electric signal generated by the diaphragm may also be directly processed by the processor.

The primary sound pickup hole 103 and the secondary sound pickup hole 104 are formed on the housing 101, respectively. The primary sound pickup hole 103 may enable the sound wave from outside of the microphone 100 to pass through a primary sound pickup channel 1031 of the housing 100 and be transmitted to the first sound pickup surface 1021 at a first sound pressure. The secondary sound pickup hole 104 may enable the sound wave to pass through a secondary sound pickup channel 1041 of the housing 100 and be transmitted to the second sound pickup surface 1022 at a second sound pressure. The second sound pressure is different from the first sound pressure.

For the MEMS-based microphone 100 having this structure, the sound pressure difference generated by sound sources in different directions of the microphone 100 on the first sound pickup surface 1021 and the second sound pickup surface 1022 may be different. In this manner, the volume suppression of the microphone 100 in a particular direction (e.g., the speaker direction) can be achieved. For example, in the design of the intelligent voice device, the speaker (not shown) may be disposed in the direction where the volume suppression effect of the MEMS-based microphone 100 is the best, thereby improving the echo cancellation effect in structure.

Thus, for the intelligent voice device using the microphone 100, no additional echo cancellation algorithm is required, which reduces the algorithmic processing pressure of the processor. On one hand, under the condition that the processing capacity is unchanged, a processor with a weak computing capability and a relatively low cost may be adopted, such that the cost of the intelligent voice device can be reduced. On the other hand, even with the same processor, the processing capacity of other processes may be improved, which improves the user experience.

Furthermore, the microphone 100 is based on the MEMS. On one hand, the MEMS-based diaphragm does not require a large size, and the front and back of the microphone do not require the same sound inlet area as the electret microphone, to achieve the desired effect, which makes the voice device adopting the microphone 100 more compact, and it is advantageous to gradually pursue miniaturization today. On the other hand, the MEMS-based microphone 100 may be soldered on the circuit board by using SMT, compared with the electret-based directional microphone product, the structural design difficulty can be reduced, and the design of the intelligent voice device can be more flexible.

In some embodiments, the second sound pressure is less than the first sound pressure, i.e., the sound wave is transmitted to the second sound pickup surface 1022 at the second sound pressure which is less than the first sound pressure. This may be achieved in any suitable manner in the art. For example, in some embodiments, in the secondary sound pickup channel 1041, a damping structure 105 may be provided, as shown in FIG. 2. The sound wave from the outside may be decompressed by the damping structure 105 and transmitted to the second sound pickup surface 1022 at the second sound pressure less than the first sound pressure, and such configuration manner may increase the sound pressure difference between the sound waves of the sound sources in different directions on the first sound pickup surface 1021 and the second sound pickup surface 1022, the volume suppression effect of the microphone 100 in a specific direction can be improved.

The damping structure 105 may be implemented in any suitable manner, as long as the sound pressure is reduced after the sound wave passes through the damping structure. For example, in some embodiments, the damping structure 105 may include at least one decompression film or have a microporous structure. Certainly, it should be understood that, the above-described manner of providing the damping structure 105 in the secondary sound pickup channel 1041 is merely exemplary, and is not intended to limit the scope of the present disclosure. Any other suitable configuration or structure capable of reducing the sound pressure is feasible.

In some alternative embodiments, the sound pressure of the sound wave transmitted to the second sound pickup surface 1022 may also be achieved by setting the opening area of the secondary sound pickup hole 104 to be less than the opening area of the primary sound pickup hole 103. That is, the secondary sound pickup hole 104 may be set to be less than the primary sound pickup hole 103, to reduce the sound pressure of the sound wave transmitted to the second sound pickup surface 1022. In this manner, it is possible to ensure that the sound pressure difference between the two sides of the MEMS diaphragm of the sound sources in different directions is different, so as to improve the volume suppression effect in a specific direction during pickup. For example, in some embodiments, each of the primary sound pickup hole 103 and the secondary sound pickup hole 104 may be a circular hole. In this case, an aperture of the secondary sound pickup hole 104 may be set to be less than an aperture of the primary sound pickup hole 103, thereby achieving the effect of transmitting the sound wave to the second sound pickup surface 1022 at the second sound pressure less than the first sound pressure.

Certainly, it should be understood that, the primary sound pickup hole 103 and the secondary sound pickup hole 104 may take any shape or configuration, and the above effect may also be achieved by designing the structure or shape (e.g., an opening shape) of the primary sound pickup channel 1031 and the secondary sound pickup channel 1041. By appropriately configuring the structure or shape of the primary sound pickup channel 1031 and the secondary sound pickup channel 1041, the sound wave passing through the secondary sound pickup channel 1041 may be transmitted to the second sound pickup surface 1022 at the second sound pressure different from the first sound pressure, thereby achieving the effect of suppressing the sound volume in a specific direction.

To prevent mutual interference of the sound waves between the primary sound pickup channel 1031 and the secondary sound pickup channel 1041, in some embodiments, the microphone 100 may further include a sound insulator 106 arranged between the primary sound pickup channel 1031 and the secondary sound pickup channel 1041. That is, the sound insulator 106 is formed as a wall or a support structure of the primary sound pickup channel 1031 and the secondary sound pickup channel 1041. This configuration may further improve the directivity of sound pickup of the microphone 100. In some embodiments, the wall of the housing 101 of the microphone 100 may include a substrate 1012 and a package cover 1013, as shown in FIGS. 1 and 2. That is, the housing 101 is packaged by the substrate 1012 and the package cover 1013, which may enable the microphone 100 to be formed as a modular product and be more conveniently applied to the product. In some embodiments, the primary sound pickup hole 103 and the secondary sound pickup hole 104 may be disposed at different positions of the same wall of the housing 101, or on different walls.

For example, in some embodiments, the package cover 1013 may have a cylindrical structure, and the primary sound pickup hole 103 and the secondary sound pickup hole 104 may be configured on the end surface of the package cover 1013, as shown in FIGS. 1 and 2. Certainly, in the present disclosure, the shape of the package cover 1013 is not limited, and the package cover 1013 may have any suitable shape. For example, in some alternative embodiments, the package cover 1013 may also have a hemisphere shape, and the primary sound pickup hole 103 and the secondary sound pickup hole 104 are configured at different positions of the package cover 1013. In some embodiments, the primary sound pickup hole 103 and the secondary sound pickup hole 104 may be provided on the package cover 1013 and the substrate 1012, respectively. Furthermore, in some embodiments, to facilitate the microphone 100 to be soldered (e.g., by SMT) to the circuit board, the housing 101 may include electrical contacts for coupling the microphone 100 to an external circuit on the circuit board. The electrical contacts are coupled to the ASIC, to conduct the audio electric signal output by the microphone 100 to the external circuit for further processing by the external circuit. Furthermore, the electrical contacts may be arranged at any suitable position on the housing 101, to make the product design to which the microphone 100 is applied more flexible.

Certainly, it should be understood that, the ASIC may also be configured external to the microphone 100. In this case, the electrical contacts may be coupled to the diaphragm 102, and the ASIC may be coupled to the diaphragm 102 through the electrical contacts. In this manner, the design of the microphone 100 or the product using the microphone 100 may be diversified.

With the MEMS-based sound pickup solution according to embodiments of the present disclosure, two pickup components are provided, and a MEMS diaphragm that can pick up sounds on both sides is provided, with the acoustic path, the sound pressure difference of the sound sources in different directions on both sides of the MEMS diaphragm is different, thereby achieving volume suppression of the microphone in a specific direction when picking up sound. The solution of the present disclosure has advantages of the MEMS microphone, and achieves directivity through structural improvement, and the volume is effectively suppressed in a specific direction. The microphone structure according to embodiments of the present disclosure may effectively reduce the pressure of suppressing the speaker volume through the algorithm, and improve the signal-to-noise ratio and the consistency.

Figure 3:
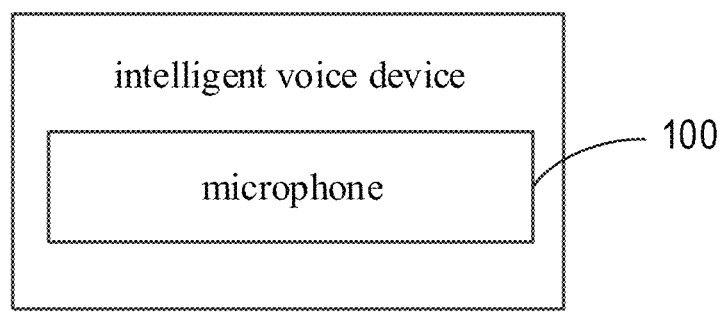
FIG. 3 is a schematic diagram of an intelligent voice device according to some embodiments of the present disclosure.

According to embodiments of the present disclosure, there is provided an intelligent voice device that employs the microphone 100 as described above. FIG. 3 is a schematic diagram of an intelligent voice device according to some embodiments of the present disclosure. The intelligent voice device may be an intelligent sound box, an intelligent sound box with a screen, an intelligent television or the like. By using the microphone 100, the intelligent voice device may have strong voice recognition capability, a more compact structure, and a richer design mode, thereby improving the user experience.

It should be understood that the above detailed embodiments of the present disclosure are merely illustrative or explanatory of the principles of the present disclosure, and are not restrictive of the present disclosure. Therefore, any modification, equivalent and improvement that fall within the spirit and principles of the present disclosure are within the scope of the present disclosure. In addition, the attached claims of the present disclosure intend to cover all variations and modifications fall within an alternative scope and a range equivalent to the scope and the range of the attached claims.

What is claimed is:

1. A microphone, comprising:
   a housing;
   a diaphragm, fixed in the housing, comprising a first sound pickup surface and a second sound pickup surface opposite to each other, and configured to output an electric signal according to a sound pressure acting on the first sound pickup surface and the second sound pickup surface;
   a primary sound pickup component, formed on the housing, and configured to transmit a sound wave from outside of the housing to the first sound pickup surface through a primary sound pickup channel at a first sound pressure;
   a secondary sound pickup component, formed on the housing, and configured to transmit the sound wave to the second sound pickup surface through a secondary sound pickup channel at a second sound pressure, the secondary sound pickup channel being less than the first sound pressure;
   a damping structure, arranged in the secondary sound pickup channel, wherein the sound wave in the secondary sound pickup channel is transmitted to the second sound pickup surface at the second sound pressure after being decompressed by the damping structure; and
   a sound insulator, arranged between the primary sound pickup channel and the secondary sound pickup channel, and configured to prevent mutual interference of sound waves between the primary sound pickup channel and the secondary sound pickup channel.

2. The microphone according to claim 1, wherein the damping structure comprises at least one decompression film or a microporous structure.

3. The microphone according to claim 1, wherein an opening area of the secondary sound pickup component is less than an opening area of the primary sound pickup component.

4. The microphone according to claim 3, wherein the secondary sound pickup component and the primary sound pickup component have a circular shape, and an aperture of the secondary sound pickup component is less than an aperture of the primary sound pickup component.

5. The microphone according to claim 1, wherein the primary sound pickup component and the secondary sound pickup component are disposed at different positions on a same wall of the housing, or at different walls of the housing.

6. The microphone according to claim 1, further comprising:
   an application specific integrated circuit ASIC, coupled to the diaphragm, and configured to generate an audio electric signal according to the electric signal.

7. The microphone according to claim 6, further comprising:
   an electrical contact, formed on the housing, and configured to couple the microphone to an external circuit, wherein the electrical contact is coupled to the ASIC to conduct the audio electric signal to the external circuit.

8. The microphone according to claim 1, wherein the housing comprises a substrate and a package cover, and the primary sound pickup component and the secondary sound pickup component are formed on the package cover.

9. An intelligent voice device, comprising a microphone, wherein the microphone comprises:
   a housing;
   a diaphragm, fixed in the housing, comprising a first sound pickup surface and a second sound pickup surface opposite to each other, and configured to output an electric signal according to a sound pressure acting on the first sound pickup surface and the second sound pickup surface;
   a primary sound pickup component, formed on the housing, and configured to transmit a sound wave from outside of the housing to the first sound pickup surface through a primary sound pickup channel at a first sound pressure;
   a secondary sound pickup component, formed on the housing, and configured to transmit the sound wave to the second sound pickup surface through a secondary sound pickup channel at a second sound pressure, the secondary sound pickup channel being less than the first sound pressure;
   a damping structure, arranged in the secondary sound pickup channel, wherein the sound wave in the secondary sound pickup channel is transmitted to the second sound pickup surface at the second sound pressure after being decompressed by the damping structure; and
   a sound insulator, arranged between the primary sound pickup channel and the secondary sound pickup channel, and configured to prevent mutual interference of sound waves between the primary sound pickup channel and the secondary sound pickup channel.

10. The intelligent voice device according to claim 9, wherein the damping structure comprises at least one decompression film or a microporous structure.

11. The intelligent voice device according to claim 9, wherein an opening area of the secondary sound pickup component is less than an opening area of the primary sound pickup component.

12. The intelligent voice device according to claim 11, wherein the secondary sound pickup component and the primary sound pickup component have a circular shape, and an aperture of the secondary sound pickup component is less than an aperture of the primary sound pickup component.

13. The intelligent voice device according to claim 9, wherein the primary sound pickup component and the secondary sound pickup component are disposed at different positions on a same wall of the housing, or at different walls of the housing.

14. The intelligent voice device according to claim 9, wherein the microphone further comprises:

an ASIC, coupled to the diaphragm, and configured to generate an audio electric signal according to the electric signal.

\* \* \* \* \*